US006922276B2

(12) United States Patent
Zhang et al.

(10) Patent No.: US 6,922,276 B2
(45) Date of Patent: Jul. 26, 2005

(54) FLEXIBLE ELECTRO-OPTIC DISPLAYS

(75) Inventors: Libing Zhang, Sharon, MA (US); Mavyn M. Holman, Peabody, MA (US); Russell J. Wilcox, Natick, MA (US); Alberto Goenaga, Santa Barbara, CA (US); Michael L. Steiner, New Richmond, WI (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 10/707,571

(22) Filed: Dec. 22, 2003

(65) Prior Publication Data

US 2004/0233509 A1 Nov. 25, 2004

Related U.S. Application Data

(60) Provisional application No. 60/319,809, filed on Dec. 23, 2002.

(51) Int. Cl.[7] .......................... G02B 36/00; G09G 3/34
(52) U.S. Cl. ...................................... 359/296; 345/107
(58) Field of Search .......................... 345/107; 359/296

(56) References Cited

U.S. PATENT DOCUMENTS

| 3,668,106 A | 6/1972 | Ota |
| 3,756,693 A | 9/1973 | Ota |
| 3,767,392 A | 10/1973 | Ota |

(Continued)

FOREIGN PATENT DOCUMENTS

| EP | 0 659 866 A2 | 6/1995 |
| EP | 1 089 118 A2 | 4/2001 |
| EP | 1 145 072 B1 | 5/2003 |
| JP | 01-142537 A | 6/1989 |
| JP | 09-211499 A | 8/1997 |
| JP | 2000-352728 | 12/2000 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |

OTHER PUBLICATIONS

Amundson, K., et al., "Flexible, Active–Matrix Display Constructed Using a Microencapsulated Electrophoretic Material and an Organic–Semiconductor–Based Backplane", SID 01 Digest, 160 (Jun. 2001).
Bach U., et al., "Nanomaterials–Based Electrochromatics for Paper–Quality Displays", Adv. Mater, 14(11), 845 (2002).
Chen, Y., et al., "A Conformable Electronic Ink Display using a Foil–Based a–Si TFT Array", SID 01 Digest, 157 (Jun. 2001).
Comiskey, B., et al., "An electrophoretic ink for all–printed reflective electronic displays", Nature, 384, 253 (1998).
Comisky, B., et al., "Electrophoretic Ink: A Printable Display Material", SID 97 Digest (1997), p. 75.
Drzaic, P., et al., "A Printed and Rollable Bistable Electronic Display", SID 98 Digest (1998), p. 1131.
Duthaler, G., et al., "Active–Matrix Color Displays Using Electrophoretic Ink and Color Filters", SID 02 Digest, 1374 (2002).
Jacobson, J., et al., "The last book", IBM Systems J., 36, 457 (1997).

(Continued)

Primary Examiner—David N. Spector
(74) Attorney, Agent, or Firm—David J. Cole

(57) ABSTRACT

An encapsulated electrophoretic medium comprises a plurality of capsules dispersed in a polymeric binder, each of the capsules comprising a capsule wall, a suspending fluid contained within the capsule wall, and a plurality of electrically charged particles suspended in the suspending fluid and capable of moving therethrough upon application of an electric field to the medium, the polymeric binder having a shear modulus of at least about 10 mPa at 20° C., and preferably over the range of 10–50° C.

34 Claims, 1 Drawing Sheet

U.S. PATENT DOCUMENTS

| | | |
|---|---|---|
| 3,792,308 A | 2/1974 | Ota |
| 3,870,517 A | 3/1975 | Ota et al. |
| 3,892,568 A | 7/1975 | Ota |
| 3,912,365 A | 10/1975 | Lowell |
| 4,414,679 A | 11/1983 | Liebert et al. |
| 4,418,346 A | 11/1983 | Batchelder |
| 4,640,583 A | 2/1987 | Hoshikawa et al. |
| 5,223,115 A | 6/1993 | DiSanto et al. |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 5,961,804 A | 10/1999 | Jacobson et al. |
| 5,999,307 A | 12/1999 | Whitehead et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,153,075 A | 11/2000 | Nemelka |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,337,761 B1 | 1/2002 | Rogers et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 * | 5/2002 | Albert ........................ 359/296 |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,498,674 B1 | 12/2002 | Sheridon |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,515,790 B2 | 2/2003 | Miyamoto et al. |
| 6,515,949 B2 | 2/2003 | Masaki et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| 6,672,921 B1 | 1/2004 | Liang et al. |
| 6,683,333 B2 | 1/2004 | Kazlas et al. |
| 6,704,133 B2 | 3/2004 | Gates et al. |
| 6,721,083 B2 | 4/2004 | Jacobson et al. |
| 6,724,519 B1 | 4/2004 | Morrison et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,825,068 B2 | 11/2004 | Denis et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,661 B2 | 3/2005 | Pullen et al. |
| 2001/0055000 A1 | 11/2001 | Hayashi et al. |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0180687 A1 | 12/2002 | Webber |
| 2003/0011560 A1 | 1/2003 | Albert et al. |
| 2003/0020844 A1 | 1/2003 | Albert et al. |
| 2003/0102858 A1 | 6/2003 | Jacobson et al. |
| 2003/0132908 A1 | 7/2003 | Herb et al. |
| 2003/0137521 A1 | 7/2003 | Zehner |
| 2003/0151702 A1 | 8/2003 | Morrison |
| 2003/0214695 A1 | 11/2003 | Abramson et al. |
| 2003/0222315 A1 | 12/2003 | Amundson et al. |

OTHER PUBLICATIONS

Jo, G–R, et al., "Toner Display Based on Particle Movements", Chem. Mater, 14, 664 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper–like display", Asia Display/IDW '01, p. 1517, Paper HCS1–1 (2001).

O'Regan, B. et al., "A Low Cost, High–efficiency Solar Cell Based on Dye–sensitized colloidal TiO2 Films", Nature, vol. 353, Oct. 24, 1991, 773–740.

Pitt, M.G., et al., "Power Consumption of Microencapsulated Electrophoretic Displays for Smart Handheld Applications", SID 02 Digest, 1378 (2002).

Webber, R., "Image Stability in Active–Matrix Microencapsulated Electrophoretic Displays", SID 02 Digest, 126 (2002).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Power AMD4–4 (2001).

* cited by examiner

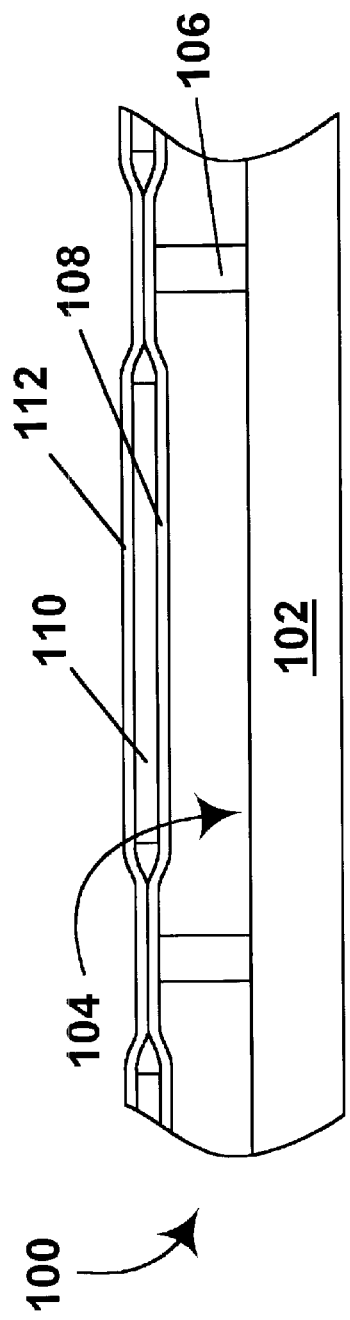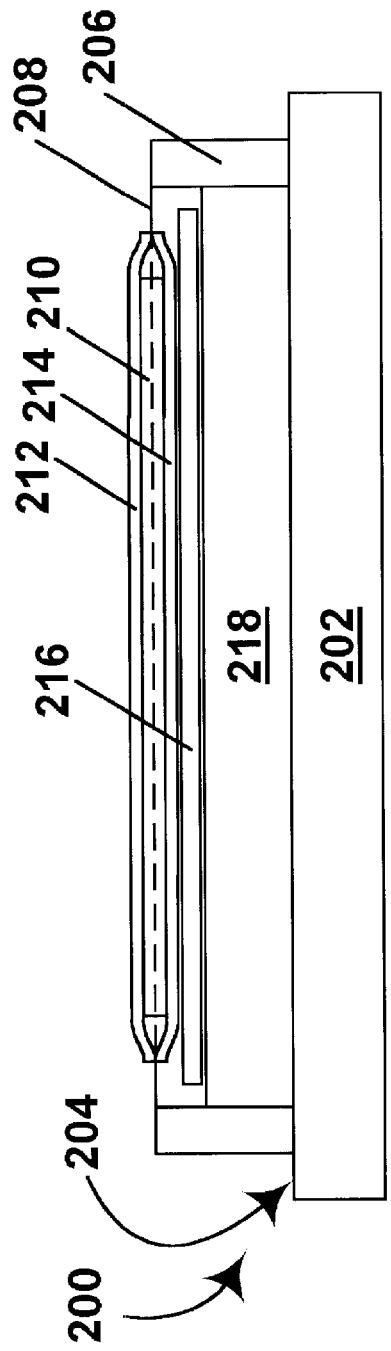

FLEXIBLE ELECTRO-OPTIC DISPLAYS

CROSS REFERENCE TO RELATED APPLICATIONS

This application claims benefit of copending Application Ser. No. 60/319,809, filed Dec. 23, 2002. The entire disclosure of this copending application is herein incorporated by reference. The entire disclosures of all U.S. patents and published and copending applications referred to below are also herein incorporated by reference.

BACKGROUND OF INVENTION

This invention relates to flexible electro-optic displays and processes for the production of such displays. This invention is especially but not exclusively intended for use with encapsulated electrophoretic displays.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; and 6,657,772; and U.S. Patent Applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011868; 2003/0020844; 2003/0025855; 2003/0034949; 2003/0038755; 2003/0053189; 2003/0076573; 2003/0096113; 2003/0102858; 2003/0132908; 2003/0137521; 2003/0137717; 2003/0151702; and 2003/0214697 and International Applications Publication Nos. WO 99/67678; WO 00/05704; WO 00/38000; WO 00/38001; WO 00/36560; WO 00/67110; WO 00/67327; WO 01/07961; and WO 01/08241.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink-jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within capsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Other types of electro-optic displays, including liquid crystal displays, may also be used in certain displays of the present invention.

One major reason why encapsulated electrophoretic displays can be produced inexpensively by printing processes is that the electrophoretic medium itself has substantial mechanical strength and cohesion; typically the individual capsules are bound together by a polymeric binder to increase the cohesion of the layer. Thus, not only can the display medium itself be printed, but as described in U.S. Pat. No. 6,177,921, an electrode may be formed by printing a conductive material directly on to the electrophoretic medium; alternatively, an electrode preformed on a substrate can be laminated on to the electrophoretic medium, which is able to withstand the heat and pressure required for such lamination without damage. In such printed or laminated structures, the mechanical strength and cohesion of the electrophoretic medium maintain the requisite spacing between the electrodes disposed on either side of the medium without any need for mechanical spacers or similar devices to control this spacing. Accordingly, if the electrodes (and any substrates attached thereto) are flexible, the encapsulated electrophoretic display can be curved or rolled without affecting the display qualities of the device; see, for example, Drzaic et al., A Printed and Rollable Bistable Electronic Display SID (Society for Information Display) 98 Digest, page 1131 (1998), which illustrates a flexible encapsulated electrophoretic display being rolled around a pencil without damage.

Although, as described above encapsulated electrophoretic media possess considerable strength and cohesion, they are still susceptible to mechanical damage during repeated bending or flexing of the display. The aforementioned U.S. Pat. No. 6,392,786 describes how spacers may be incorporated into the electrophoretic medium to reduce the susceptibility of the medium to such mechanical damage. The present invention provides alternative approaches, which may be used in place of or in combination with, such spacers to reduce the susceptibility of an encapsulated electrophoretic medium to mechanical damage.

As already mentioned, typically an encapsulated electrophoretic medium comprises microcapsules embedded in a polymeric binder. It is readily apparent that the mechanical properties of the medium will vary with those of the polymeric binder as well as those of the microcapsules. The microcapsules typically used in the electrophoretic media described in the aforementioned patents and published applications comprise a coacervated gelatin shell surrounding a hydrocarbon suspending fluid containing the electrophoretic particles. These microcapsules are relatively soft and deformable, and hitherto it has been assumed that the binder should similarly be of low modulus, in order that the deformable microcapsules not be damaged by a relatively rigid binder. It has now surprisingly been found that encapsulated electrophoretic media prepared using high modulus, relatively rigid binders have better resistance to mechanical damage than similar media prepared using low modulus binders.

Many of the patents and published applications mentioned above describe encapsulated electrophoretic displays in which only one of the two electrodes needed to apply an electric field to the electrophoretic medium is permanently secured to that medium, the other electrode being in the form of a movable stylus or similar writing instrument which is moved over the medium to form the desired image. Similar stylus-based displays can of course be produced using other types of electro-optic media, for example, the rotating bichromal member media described above. All such stylus-based displays are especially susceptible to mechanical damage because of the risk of a user exerting excessive pressure on the narrow tip of a stylus. In addition, stylus-based displays cannot readily make use of the same type of front protective layer which can be used in displays with non-movable electrodes. In the latter type of display, the transparent front electrode (the electrode through which an observer views the electrophoretic medium) is typically a layer of indium tin oxide (ITO), a conductive polymer or a similar material disposed on the surface of a polymeric film, with the electrode being interposed between the film and the electro-optic medium in order to produce the maximum possible field across the medium for any given operating voltage, i.e., the electrode is on the "inside" surface of the polymeric film. Thus, changes in the thickness of this film do not affect the electric field applied to the electro-optic medium, and it is therefore possible to use a relatively thick (say 100–200 $\mu$m) film to provide mechanical protection to the medium, the allowable thickness of the film being limited only by the degree of flexibility required in the display. In contrast, in a stylus-based display, the stylus is necessarily disposed on the "outside" surface of any front polymeric film, and increasing the thickness of this film decreases the field across the electro-optic medium for any given operating voltage. Thus, in a stylus-based display, the thickness of the front film is necessarily a compromise between the need for as large a field as possible across the electro-optic medium and the need for protection of the medium, and in practice such stylus-based displays tend to have thinner front films than displays using fixed electrodes, and hence to be more susceptible to mechanical damage. Certain aspects of the present invention are especially directed to reducing the susceptibility of stylus-based displays to mechanical damage.

SUMMARY OF INVENTION

Accordingly, in one aspect this invention provides an encapsulated electrophoretic medium comprising a plurality of capsules dispersed in a polymeric binder, each of the capsules comprising a capsule wall, a suspending fluid contained within the capsule wall, and a plurality of electrically charged particles suspended in the suspending fluid and capable of moving therethrough upon application of an electric field to the medium, the polymeric binder having a shear modulus of at least about 10 mPa. This aspect of the invention may hereinafter for convenience be called the "high modulus binder" electrophoretic medium.

In such a high modulus binder electrophoretic medium, desirably, the binder has a shear modulus of at least about 25, and desirably at least about 50 mPa. The binder preferably has a shear modulus of at least about 10 mPa over a temperature range of at least 10 to 50° C., and may comprise a polyurethane.

This invention also provides an electro-optic display comprising a layer of an encapsulated electrophoretic medium comprising a plurality of capsules dispersed in a polymeric binder, each of the capsules comprising a capsule wall, a suspending fluid contained within the capsule wall, and a plurality of electrically charged particles suspended in the suspending fluid and capable of moving therethrough upon application of an electric field to the medium, the polymeric binder having a shear modulus of at least about 10 mPa at 20° C.; and at least one electrode adhered to the layer of encapsulated electrophoretic medium, the binder having a peel strength from the electrode of at least about 2 lb/inch (approximately 0.35 kg/cm). Desirably, the binder has a peel strength from the electrode of at least about 4 lb/inch (approximately 0.7 kg/cm). Again, the binder may comprise a polyurethane.

In another aspect, this invention provides an electro-optic display comprising a support member having a support surface, a plurality of spacer members extending in one direction away from the support surface, a protective sheet contacting the ends of the spacer members remote from the support surface, and an electro-optic medium supported by the protective sheet. This aspect of the invention may hereinafter for convenience be called the "suspended sheet" display of the invention.

Such a suspended sheet display may further comprise a second protective sheet disposed on the opposed side of the electro-optic medium from the protective sheet contacting the ends of the spacer members. The electro-optic medium may have the form of an interrupted layer, the electro-optic medium not being present immediately adjacent the areas of the protective sheet contacting the ends of the spacer members. Also, the display may further comprise a layer of resilient material, for example a solid foam, disposed between the support surface and the protective sheet.

Finally, this invention provides a tensioned member display comprising a support member having a support surface, a plurality of spacer members extending in one direction away from the support surface, a plurality of tensioning members each extending upon tension between at least two of the spacer member, and an electro-optic medium through which the support members pass, the electro-optic medium being supported spaced from the support surface by the tensioning members passing through the electro-optic medium. In one form of such a tensioned member display, the support members are arranged in two parallel rows with the tensioning members extending parallel to each other between one support member in each row. The tensioned member display may further comprise at least one protective layer sheet disposed adjacent the electro-optic medium and/or at least one electrode disposed adjacent the electro-optic medium. The tensioned member display may further comprise least one of a load distributing member and a layer of resilient material disposed between the electro-optic medium and the support surface.

BRIEF DESCRIPTION OF DRAWINGS

FIG. 1 of the accompanying drawings is a schematic side elevation of a suspended sheet display of the present invention.

FIG. 2 is a schematic side elevation of a tensioned member display of the present invention.

DETAILED DESCRIPTION

As already mentioned, in one aspect this invention provides a high modulus binder electrophoretic display in which the polymeric binder has a shear modulus of at least about 10 mPa at 20° C. Desirably, the polymeric binder has at shear modulus of at least about 25 mPa, and preferably at least about 50 mPa, at 20° C. It has been found that use of a binder with a shear modulus of about 100 mPa gives good results; there appears to be no significant advantage in increasing the shear modulus of the binder above about 200 mPa.

Shear modulus is of course a function of temperature, and while for purposes of the present invention the relevant shear modulus is that measured at 20° C., the shear modulus of the binder should remain above the desired minimum over the entire operating range of the display, which might typically be 10–50° C., or more.

In addition to the shear modulus, another important characteristic of the binder is good adhesion to the adjacent layers of the electrophoretic display, and particularly the electrode material. As already mentioned, one useful technique for forming an electrophoretic display comprises printing an encapsulated electrophoretic medium on to a substrate, which is typically a polymeric film bearing a transparent electrode formed of a material such as ITO; poly(ethylene terephthalate) (PET) films bearing ITO layers of the requisite thickness are readily available commercially and are very suitable for use as substrates in such a process. However, if a flexible display produced by such a process is to have sufficient resistance to mechanical damage during repeated flexing, it is necessary that the binder have sufficient adhesion to the ITO or other electrode material, or there is a tendency for the electrophoretic medium to shear at its interface with the electrode. The binder should have a peel strength from the electrode material with which is in contact of at least about 2, and preferably at least about 4, lb/inch (at least about 0.35, and preferably at least about 0.7 kg/cm). The peel strength from the specific electrode material used is best determined empirically, since it should be noted that the properties of electrode materials such as ITO, fluorine-doped tin oxide and organic semiconductors may vary considerably with the manner in which the layers are deposited so that, for example, the peel strength of any specific binder from an ITO-coated polymer film may vary greatly depending upon the exact process used to deposit the ITO. Those skilled in adhesion technology will be aware of a number of standard procedures, such as that prescribed by the American Society for Testing and Materials, which may be used to measure the relevant peel strength.

The following Examples are now given, though by way of illustration only, to show details of preferred materials, processes and techniques used in the high modulus binder aspect of the present invention.

EXAMPLE 1 (CONTROL)

Encapsulated dual particle electrophoretic displays were prepared substantially as described in Examples 27–29 of the aforementioned 2002/0185378, except that the binder used was pure NeoRez R 9320, available from NeoResins, 730 Main Street, Wilmington, Mass. 01887 ("NEOREZ" is a Registered Trade Mark). R 9320 is a non-ionically stabilized polyester-based water-dispersed urethane adhesive, and is a soft material with a shear modulus of approximately 1 mPa at 20° C. and relatively poor adhesion to ITO-coated PET, as shown by a peel strength (determined by hot laminating the adhesive between two sheets of ITO-coated PET and peeling on PET back at a 180° angle) of less than 1 lb/inch (less than about 0.2 kg/cm).

Wrapping the displays thus prepared around a 1 inch (25 mm) mandrel for 24 hours resulted in significant capsule bursting. The samples also showed significant capsule damage after 5–6 successive bends around the same mandrel. Finally, the compressive strength of the capsules (as measured by applying a stylus 1 mm in diameter normal to the displays) was 750 g.

EXAMPLE 2

Encapsulated dual particle electrophoretic displays were prepared in the same way as in Example 1 except that the binder used was a 1:1 w/w blend of NeoRez 9621 and NeoRez 9314; both these materials are water-dispersed polyurethane adhesives from the same supplier as the NeoRez 9320 mentioned above. The resultant binder has a shear modulus of approximately 100 mPa and an adhesion (measured in the same manner as in Example 1) of more than 4 lb/inch (more than about 0.7 kg/cm).

Wrapping the displays thus prepared around a 1 inch (25 mm) mandrel for two weeks resulted in no measurable capsule bursting. In addition, only minor capsule damage was observed after 100 successive bends around the same mandrel. Finally, the compressive strength of the capsules (measured in the same manner as in Example 1) was greater than 1100 g.

In addition to the high modulus binder aspect of the invention, the present invention provides several other improvements relating to improving the resistance of electrophoretic and other electro-optic displays against mechanical damage.

One group of improvements of the present invention are variants of the use of spacers in electrophoretic displays, as described in the aforementioned U.S. Pat. No. 6,392,786. This patent describes the use of various types of spacers in electrophoretic displays, and the incorporation of spacers into the electrophoretic medium by printing or coating a mixture of the spacers and the capsules in a binder on to the surface of a substrate, or by first printing or coating the capsules in a binder on to the surface of a substrate, and thereafter incorporating spacers into the resultant capsules/binder layer.

The present invention provides several variants on these procedures. Firstly, it has been realized that it is desirable to use spacers with substantially the same resistivity as the capsule/binder combination in order to prevent distortion of the electric field within the electrophoretic layer, since this minimizes the effects of the spacers on the image displayed. It may also be advantageous to distribute the spacers over the substrate and thereafter to deposit the capsule/binder material over the spacers and the substrate. Alternatively, after first depositing the capsule/binder material, the spacers may distributed over the surface of this material, and a second substrate placed over the capsule/binder material and the spacers and laminated to the first substrate to form the finished display.

In a further variant of the present invention, the discrete spacers described in U.S. Pat. No. 6,392,786 are replaced with a continuous mesh of a spacer material, conveniently a polymeric mesh. The mesh may be thicker than the capsule/binder layer so that the capsule/binder material in effect forms a plurality of separate cells within the apertures in the mesh of spacer material. The spacer mesh may be laid down on the substrate, possibly with adhesive, and the capsule/binder material coated over the mesh so that the capsule/binder material enters into the apertures within the mesh. Alternatively, the capsule/binder material may first be coated upon the substrate and the mesh then placed over the capsule/binder material before a second substrate is laminated to the first substrate to complete the display.

It is also possible to use a mesh or similar material as an "external" support for an electrophoretic or other electro-optic display in order to minimize mechanical damage to a display. Such an external support may be provided by coating the electro-optic medium on to a first substrate and laminating a second substrate (which is preferably a thin but sturdy sheet, for example an electrostatic discharge plastic sheet) on the opposed side of the electro-optic medium from the first substrate. The resultant sandwich can then be laid over a support member having the form of a mesh or a rigid support member of similar cross-section, for example a plastic honeycomb. When a display is supported by such a mesh or honeycomb and excessive pressure is applied to the display, capsule bursting or similar damage will be confined to the limited portions of the display in contact with the members of the mesh or honeycomb, leaving the major part of the display area still functional.

In a related approach, the electro-optic medium may be divided into a plurality of small sections and these small sections placed within apertures in a honeycomb or similar support structure having relatively large apertures separated by thin walls. Although the dividing walls in such a structure are optically inactive (i.e., they cannot change optical state in the same way the electro-optic medium does), the resultant display is robust, since mechanical forces are absorbed by the walls. Thus, this form of the invention is especially suitable for large signs, for example, signs used at exhibitions, which will be subjected to repeated mechanical handling and in which the presence of narrow inactive areas does not greatly affect the quality of the large image displayed.

As already mentioned, in another aspect the present invention provides a suspended sheet display comprising a support member having a support surface, a plurality of spacer members extending in one direction away from the support surface, a protective sheet contacting the ends of the spacer members remote from the support surface, and an electro-optic medium supported by the protective sheet. A preferred embodiment of such a suspended sheet display will now be described with reference to FIG. 1 of the accompanying drawings.

FIG. 1 shows a schematic side elevation of a suspended sheet display (generally designated 100) of the present invention. This display 100 comprises a support member 102 in the form of a flat plate, conveniently formed from a rigid polymer, having on its upper side a support surface 104. A plurality of cylindrical spacer members 106 extend upwardly (in the orientation of the display shown in FIG. 1) away from the support surface 104; although only two spacer members 106 are shown in FIG. 1, in practice a large number of spacer members 106 would be present arranged on a regular grid, preferably a square grid.

A protective sheet 108 contacts the (upper) ends of the support members 106 remote from the support surface 104, so that the protective sheet 108 is suspended spaced from the support surface 104. An electro-optic medium 110 provided with at least a bottom electrode (not shown) is disposed on and supported by the protective sheet 108. A second protective sheet 112 covers the upper surface of the electro-optic medium 110.

As shown in FIG. 1, the electro-optic medium 110 is not continuous but "interrupted" (discontinuous), not being present in the areas directly above the spacer members 106. The display 100 is designed to be written by means of a stylus or similar writing device (not shown) which is passed over the upper surface (in FIG. 1) of the second protective sheet 112. As will readily be apparent to those skilled in mechanical engineering, when the stylus is pressed against the sheet 112 to write on the display 100, the resultant stress on the sheet 108 is taken up on the spacer members 106, so that the areas directly above the spacer members 106 are areas of stress concentration. Omitting the electro-optic medium from these areas prevents damage to the electro-optic medium.

In one process for preparing the suspended sheet display shown in FIG. 1, the electro-optic medium is first coated in the usual way on a substrate bearing an electrode, and a second substrate is then laminated over the electro-optic medium. The resultant "sandwich" structure is then cut, conveniently by laser cutting, to remove the portions of the structure which will, in the final display, rest directly above the spacer members 106. At this point, it may be necessary or desirable to clean the sandwich structure to remove debris generated during the cutting operation. Following any such cleaning, the cut sandwich structure is laminated between two polymer sheets (which eventually form the sheets 108 and 112 and the laminated structure is placed upon a pre-assembled structure comprising the support member 102 and the spacer members 106 to form the final display.

Alternatively, the display shown in FIG. 1 could be prepared by first applying to the substrate bearing the electrode a plurality of disks or similar laminae, these disks or laminae being arranged in a pattern corresponding to the spacer members 106, and then coating the electro-optic medium over the substrate, the thickness of the coating being controlled so that the electro-optic medium is not present in the areas where the disks or laminae are present. The second protective sheet is then laminated over the electro-optic medium. The resultant structure may then be used directly in the display of FIG. 1 without the need for cutting and subsequent cleaning of the medium. Furthermore, the disks or laminae can act as reinforcements for the medium in the areas of high stress adjacent the end surfaces of the spacer members 106.

The display shown in FIG. 1 may be modified by providing a resilient material, for example a solid foam, between the support surface 104 and the protective sheet 108; the provision of this resilient material may further improve the resistance of the display to mechanical damage.

Finally, as already mentioned, in another aspect the present invention provides a tensioned member display comprising a support member having a support surface, a plurality of spacer members extending in one direction away from the support surface, and an electro-optic medium supported by tensioning members extending therethrough, each of the tensioning members extending under tension between at least two of the spacer members. A preferred embodiment of such a tensioned member display will now be described with reference to FIG. 2 of the accompanying drawings.

FIG. 2 shows a schematic side elevation of a tensioned member display (generally designated 200) of the present invention. This display 200 comprises a support member 202 in the form of a flat plate, conveniently formed from a rigid polymer, having on its upper side a support surface 204. A plurality of cylindrical post members 206 extend upwardly (in the orientation of the display shown in FIG. 2) away from the support surface 204; although only two post members 206 are shown in FIG. 2, in practice a number of such members 206 would be present arranged on in two parallel rows along opposed edges of the display. Tension members 208 in the form of polymer filaments have their opposed ends secured to two different post members 206, one in each of the two parallel rows, so that the tension members extend parallel to each other under tension between the posts. The tension members 208 pass through an electro-optic sheet comprising a layer of electro-optic medium 210 provided on its lower surface (in the orientation of the display shown in FIG. 2) with an electrode (not shown) and sandwiched between two protective sheets 212 and 214.

The exact structure of the electro-optic sheet may vary depending upon the type of electro-optic medium 210 used. If the electro-optic medium is an encapsulated electrophoretic medium, the tension members 208 may be placed on the electrode-bearing substrate of the display before the encapsulated electrophoretic medium is coated thereon, so that the tension members actually extend through the layer of electrophoretic medium itself. In other cases, for example where the electro-optic medium is an electrochromic medium, this may not be practical and in such cases the tension members might be fused or otherwise secured to one of the protective sheets 212 and 214.

Regardless of the exact location of the tension members within the electro-optic sheet, the tension members serve to support and reinforce the electro-optic sheet and reduce its susceptibility to mechanical damage. To further reduce the susceptibility to mechanical damage, a load distributing member 216 (conveniently a sheet of cardboard) is disposed immediately below the electro-optic sheet, and a layer of resilient material 218 (conveniently a solid foam) is disposed between the load distributing member 216 and the support surface 204. The load distributing member 216 and resilient material 218 (either or both of which can be omitted if desired) serve to provide additional support to the electro-optic sheet and hence reduce its susceptibility to mechanical damage.

From the foregoing description, it will be seen that the present invention provides several improvements which reduce the susceptibility of electro-optic displays to mechanical damage, especially when such displays are of the stylus-based type.

Numerous changes and modifications can be made in the preferred embodiments of the present invention already described without departing from the spirit and skill of the invention. For example, although the invention has been described above mainly with reference to encapsulated electrophoretic displays, at least the suspended sheet and tensioned member embodiments of the present invention can make use of any of the types of electro-optic media discussed above. In view of these possible variations, the foregoing description is to be construed in an illustrative and not in a limitative sense.

What is claimed is:

1. An encapsulated electrophoretic medium comprising a plurality of capsules dispersed in a polymeric binder, each of the capsules comprising a capsule wall, a suspending fluid contained within the capsule wall, and a plurality of electrically charged particles suspended in the suspending fluid and capable of moving therethrough upon application of an electric field to the medium, the polymeric binder having a shear modulus of at least about 10 mPa at 20° C.

2. An encapsulated electrophoretic medium according to claim 1 wherein the polymeric binder has a shear modulus of at least about 25 mPa at 20° C.

3. An encapsulated electrophoretic medium according to claim 1 wherein the polymeric binder has a shear modulus of at least about 50 mPa at 20° C.

4. An encapsulated electrophoretic medium according to claim 1 wherein the polymeric binder has a shear modulus of at least about 10 mPa over a temperature range of at least 10 to 50° C.

5. An encapsulated electrophoretic medium according to claim 1 wherein the polymeric binder comprises a polyurethane.

6. An electro-optic display comprising:
a layer of an encapsulated electrophoretic medium comprising a plurality of capsules dispersed in a polymeric binder, each of the capsules comprising a capsule wall, a suspending fluid contained within the capsule wall, and a plurality of electrically charged particles suspended in the suspending fluid and capable of moving therethrough upon application of an electric field to the medium, the polymeric binder having a shear modulus of at least about 10 mPa at 20° C.; and
at least one electrode adhered to the layer of encapsulated electrophoretic medium, the binder having a peel strength from the electrode of at least about 2 lb/inch.

7. An electro-optic display according to claim 6 wherein the binder has a peel strength from the electrode of at least about 4 lb/inch.

8. An electro-optic display according to claim 6 wherein the polymeric binder comprises a polyurethane.

9. An electro-optic display comprising a support member having a support surface, a plurality of spacer members extending in one direction away from the support surface, a protective sheet contacting the ends of the spacer members remote from the support surface, and an electro-optic medium supported by the protective sheet.

10. An electro-optic display according to claim 9 further comprising a second protective sheet disposed on the opposed side of the electro-optic medium from the protective sheet contacting the ends of the spacer members.

11. An electro-optic display according to claim 9 wherein the electro-optic medium has the form of an interrupted layer, the electro-optic medium not being present immediately adjacent the areas of the protective sheet contacting the ends of the spacer members.

12. An electro-optic display according to claim 9 wherein the electro-optic medium is an encapsulated electrophoretic medium.

13. An electro-optic display according to claim 9 further comprising a layer of resilient material disposed between the support surface and the protective sheet.

14. An electro-optic display according to claim 13 wherein the resilient material comprises a solid foam.

15. An electro-optic display according to claim 9 wherein the electro-optic medium comprises a rotating bichromal member medium or an electrochromic medium.

16. An electro-optic display according to claim 9 wherein the electro-optic medium comprises a suspending fluid and a plurality of electrically charged particles, the suspending fluid and the particles being present as a plurality of discrete droplets, the electrophoretic medium further comprising a continuous phase of polymeric material surrounding droplets.

17. An electro-optic display according to claim 9 wherein the electro-optic medium comprises a suspending fluid and a plurality of electrically charged particles, the suspending fluid and the particles being retained within a plurality of cavities formed in a carrier medium.

18. A tensioned member display comprising a support member having a support surface, a plurality of spacer members extending in one direction away from the support surface, a plurality of tensioning members each extending upon tension between at least two of the spacer member, and an electro-optic medium through which the support members pass, the electro-optic medium being supported spaced from the support surface by the tensioning members passing through the electro-optic medium.

19. A tensioned member display according to claim 18 wherein the support members are arranged in two parallel rows with the tensioning members extending parallel to each other between one support member in each row.

20. A tensioned member display according to claim 18 further comprising at least one protective layer sheet disposed adjacent the electro-optic medium.

21. A tensioned member display according to claim 18 further comprising at least one electrode disposed adjacent the electro-optic medium.

22. A tensioned member display according to claim 18 further comprising at least one of a load distributing member and a layer of resilient material disposed between the electro-optic medium and the support surface.

23. A tensioned member display according to claim 18 wherein the electro-optic medium is an encapsulated electrophoretic medium.

24. A tensioned member display according to claim 18 wherein the electro-optic medium comprises a rotating bichromal member medium or an electrochromic medium.

25. A tensioned member display according to claim 18 wherein the electro-optic medium comprises a suspending fluid and a plurality of electrically charged particles, the suspending fluid and the particles being present as a plurality of discrete droplets, the electrophoretic medium further comprising a continuous phase of polymeric material surrounding the droplets.

26. A tensioned member display according to claim 18 wherein the electro-optic medium comprises a suspending fluid and a plurality of electrically charged particles, the suspending fluid and the particles being retained within a plurality of cavities formed in a carrier medium.

27. An electrophoretic medium comprising a suspending fluid and a plurality of electrically charged particles suspended in the suspending fluid and capable of moving therethrough upon application of an electric field to the medium, the suspending fluid and the particles being present as a plurality of discrete droplets, the electrophoretic medium further comprising a continuous phase of polymeric binder surrounding the droplets, the polymeric binder having a shear modulus of at least about 10 mPa at 20° C.

28. An encapsulated electrophoretic medium according to claim 27 wherein the polymeric binder has a shear modulus of at least about 25 mPa at 20° C.

29. An encapsulated electrophoretic medium according to claim 27 wherein the polymeric binder has a shear modulus of at least about 50 mPa at 20° C.

30. An encapsulated electrophoretic medium according to claim 27 wherein the polymeric binder has a shear modulus of at least about 10 mPa over a temperature range of at least 10 to 50° C.

31. An encapsulated electrophoretic medium according to claim 27 wherein the polymeric binder comprises a polyurethane.

32. An electro-optic display comprising:

a layer of an electrophoretic medium comprising a suspending fluid and a plurality of electrically charged particles suspended in the suspending fluid and capable of moving therethrough upon application of an electric field to the medium, the suspending fluid and the particles being present as a plurality of discrete droplets, the electrophoretic medium further comprising a continuous phase of polymeric binder surrounding the droplets, the polymeric binder having a shear modulus of at least about 10 mPa at 20EC; and at least one electrode adhered to the layer of electrophoretic medium, the binder having a peel strength from the electrode of at least about 2 lb/inch.

33. An electro-optic display according to claim 32 wherein the binder has a peel strength from the electrode of at least about 4 lb/inch.

34. An electro-optic display according to claim 32 wherein the polymeric binder comprises a polyurethane.

* * * * *